United States Patent [19]
Hultman

[11] 3,852,033
[45] Dec. 3, 1974

[54] PROCESS FOR CONTROLLING CHLORATE AND HYDROGEN ION CONTENT IN THE MANUFACTURE OF CHLORINE DIOXIDE FROM ALKALI METAL CHLORATE AND AN INORGANIC ACID

[75] Inventor: Bengt Goran Hultman, Domsjoverken, Sweden

[73] Assignee: Mo och Domsjo Aktiebolag, Ornskoldsvik, Sweden

[22] Filed: July 9, 1973

[21] Appl. No.: 377,857

[30] Foreign Application Priority Data
July 14, 1972   Sweden.............................. 9343/73

[52] U.S. Cl............... 23/230 A, 23/253 A, 423/478
[51] Int. Cl...................... G01n 25/20, C01b 11/02
[58] Field of Search.......... 23/230 A, 230 R, 253 R, 23/253 A; 73/15 R; 423/478

[56] References Cited
UNITED STATES PATENTS

| | | | |
|---|---|---|---|
| 3,276,843 | 10/1966 | Cooper, Jr. | 23/230 A |
| 3,754,081 | 8/1973 | Partridge et al. | 423/478 |
| 3,760,065 | 9/1973 | Rapson | 423/478 |

*Primary Examiner*—R. E. Serwin

[57] ABSTRACT

A process for controlling the chlorate and hydrogen ion content of the reaction mixture in the manufacture of chlorine dioxide from alkali metal chlorate and inorganic acid, to improve the yield of chlorine dioxide and minimize side reactions. The concentration of chlorate ions and hydrogen ions in the reaction mixture is monitored calorimetrically, the addition to the system of chlorate, reducing agent and inorganic acid is controlled in a manner to maintain the chlorate and hydrogen ion concentrations thereof at a desired level.

24 Claims, 4 Drawing Figures

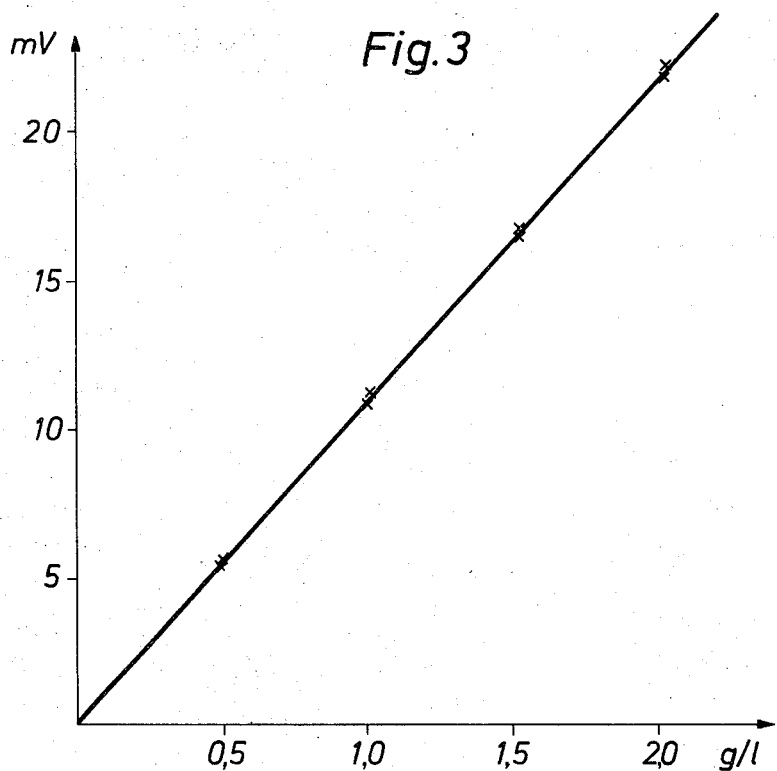
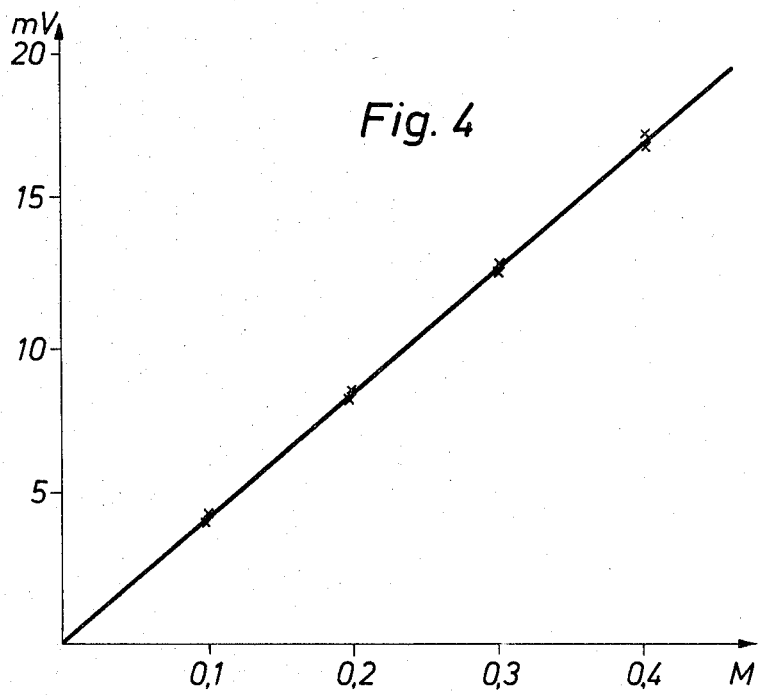

PROCESS FOR CONTROLLING CHLORATE AND HYDROGEN ION CONTENT IN THE MANUFACTURE OF CHLORINE DIOXIDE FROM ALKALI METAL CHLORATE AND AN INORGANIC ACID

Chlorine dioxide is normally produced by reaction of alkali metal chlorate with a reducing agent in an aqueous acidic reaction medium. The chlorate is normally sodium chlorate, although potassium chlorate can also be used; however, sodium chlorate is preferred due to the ease of dissolution of sodium chlorate.

The sodium chlorate solution is usually produced by electrolysis of aqueous sodium chloride solution, or by dissolving solid sodium chlorate in water. Sulfur dioxide is preferred as the reducing agent, although methanol can also be used, and the inorganic acid is usually sulfuric acid. If sodium chloride is present, it can also serve as a reducing agent.

The principal reactions resulting in the formation of chlorine dioxide in which sodium chloride, sulfur dioxide and methanol, respectively, act as the reducing agent are as follows:

1. $NaClO_3 + NaCl + H_2SO_4 \rightarrow ClO_2 + 0.5\ Cl_2 + Na_2SO_4 + H_2O$
2. $2NaClO_3 + SO_2 \rightarrow 2ClO_2 + Na_2SO_4$
3. $2NaClO_3 + CH_3OH + H_2SO_4 \rightarrow 2ClO_2 + HCHO + Na_2SO_4 + 2H_2O$ The highest theoretical yield possible is one mole of chlorine dioxide for each mole of sodium chlorate reacted. As a by product of this reaction ½ mole of chlorine is also produced, when the reducing agent is sodium chloride, and this chlorine can be disposed of as a by product, for use, for example, as a bleaching agent.

In additiion to the desired reactions, side reactions may also take place, of which the principal side reactions are as follows:

4. $NaClO_3 + 5NaCl + 3H_2SO_4 \rightarrow 3Cl_2 + 3Na_2SO_4 + 3H_2O$
5. $2NaClO_3 + 6SO_2 + 6H_2O \rightarrow 2HCl + 5H_2SO_4 + Na_2SO_4$
6. $2NaClO_3 + 3CH_3OH + H_2SO_4 \rightarrow 2HCl + Na_2SO_4 + 3HCHO + 3H_2O$ Each of these reactions results in loss of chlorate by conversion into a less expensive chemical, and it is desirable for economic reasons to minimize these side reactions. However, it is virtually impossible to completely eliminate these side reactions, which normally take place concurrently with the chlorine dioxideforming reaction, since the starting materials are the same, and the reactions take place under the same conditions in aqueous acidic medium.

One way of controlling the side reactions is to maintain relative proportions of the reactants that favor the desired reactions. since in reactions (1) to (3) sodium chlorate and acid and reducing agent react to form chlorine dioxide at a relatively high proportion of the sodium chlorate, and the side reactions (4) to (6) take place at relatively high proportions of the reducing agent (sodium chloride, sulfur dioxide or methanol) to sodium chlorate, it is apparent that the desired reactions resulting in the production of chlorine dioxide are favored by maintaining a relatively high concentration of sodium chlorate to reducing agent and to maintain an empirically determined optimum concentration of acid at all times in the reaction mixture. It is therefore important to maintain the sodium chlorate concentration at a high level throughout the reaction. Since chlorate is of course consumed in the reaction, this means that sodium chlorate must be added to the reaction mixture as it is consumed, or the side reactions will begin to take place in increasingly larger proportions. In order to know how much chlorate to add, however, it is necessary to determine the concentration of chlorate and hydrogen ion in the reaction system from time to time.

Surprisingly, despite the large quantities of chemicals used in the production of chlorine dioxide, no reliable method to continually analyze the reaction for chlorate ion has been developed. Reliance has been placed on samples taken periodically which are analyzed by manual titration techniques. No method for continuously determining chlorate ion concentration or hydrogen ion concentration in the system has been devised. It has been proposed that ion selective electrodes be used, but the results obtained have been unreliable, owing to rapid deterioration of the electrodes, possibly due to corrosion by the acidic reaction solution.

Efficient control of the course of the reaction requires an automatic analysis system, capable of determining chlorate and hydrogen ion concentration in the system at different stages of the manufacturing process, either continuously or at frequent intervals. Such an analysis system would make it possible to maintain the optimum concentration of chlorate ion and other reaction conditions constant, and thereby obtain a high and uniform production of chlorine dioxide, with minimum losses of chlorate in the production of chlorine- and chloride-producing side reactions.

Moreover, such an analysis system would make it possible in a continuous process to ensure virtually complete consumption of chlorate in the reaction system, and thus keep the chlorate content of the spent acid solution at a minimum, without having to add excess quantities of sulfur dioxide to destroy it. Sulfur dioxide can react with chlorine dioxide in accordance with the following reaction:

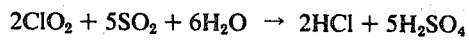

$2ClO_2 + 5SO_2 + 6H_2O \rightarrow 2HCl + 5H_2SO_4$

Accordingly, it is undesirable to add excess sulfur dioxide to the system, since if the sulfur dioxide enters the chlorine dioxide recovery system, the yield of chlorine dioxide is reduced by this reaction.

In accordance with the present invention, a process is provided for measuring the chlorate ion and the hydrogen ion concentration of chlorine dioxideproducing reaction mixtures comprising alkali metal chlorate, reducing agent, and inorganic acid by a calorimetric determination. One sample of the reaction mixture is combined with a substance referred to herein as a chlorate ion reagent, which reacts with chlorate ions with liberation of heat, and another sample of the reactionmixture is combined with a substance referred to herein as a hydrogen ion reagent, which reacts with hydrogen ions with liberation of heat. The heat liberated in each reaction is measured, and the amount of heat liberated is used as a measure of the concentration of chlorate and hydrogen ions present. The addition of the required amount of alkali metal chlorate and/or reducing agent and/or acid can then be made, to maintain chlorate and hydrogen ion concentration at a desired level in the reaction mixture. The technique is applicable to batch reaction systems, but is of particular application to continuous flow reaction systems.

In accordance with the invention, there also is provided a process for control of a chlorine dioxide-producing reaction system comprising an alkali metal chlorate, inorganic acid and reducing agent comprising determining calorimetrically the concentrations of chlorate and hydrogen ions in the reaction mixture, and according to the concentrations thus determined controlling the addition of alkali metal chlorate, reducing agent and acid to the system so as to maintain the chlorate ion, and hydrogen ion concentrations thereof at a level to favor the reactions resulting in the production of chlorine dioxide, and minimize side reactions resulting in loss of chlorate, such as in the formation of chlorine and alkali metal chlorides.

The calorimetric determination can be carried out with any available calorimeter. As is generally known, there are two principal types of calorimeters, one determining the heat liberated adiabatically, and one determining the heat liberated isothermally. Either type of calorimeter can be used in the present invention. A type which converts the heat liberated to an electric signal such as a voltage pulse which is a function of the heat liberated is preferred.

Any substance which reacts exothermically with chlorate ions with liberation of heat can be used as the chlorate ion reagent. The reactions preferably should result in the liberation of a relatively high proportion of heat per unit weight, so as to increase the accuracy of the determination with a small concentration of chlorate ion in a small sample. Suitable reagents include sulfuric acid solution of ferrous sulphate, hydrazine hydrogen sulphate, hydroxylamine, and mixtures thereof.

The hydrogen ion reagent is a strong base which reacts exothermically with acids such as an alkali metal or alkaline earth metal hydroxide, for example, sodium hydroxide, potassium hydroxide, and ammonium hydroxide, and mixtures thereof.

The heat of reaction is an exact stoichiometric function of the amount of chlorate or hydrogen ion present, and the addition of the reagent in excess ensures complete reaction and the stoichiometric amount of heat liberated. The proportions of reagent and sample should however be constant. The concentration of reagent is not critical but of course convenience of handling suggests use of minimum volumes of sample and reagent. It may however be desirable to minimize corrosive attack on the equipment to use dilute rather than concentrated acid solutions.

The heat of reaction which is liberated can be measured by one or more thermo-elements, thermopiles, or thermistors. The heat of reaction can be measured by sampling from time to time, but a continuous sampling and measuring apparatus or flow calorimeter is preferred, since the measuring apparatus can then be fully sealed, preventing contact of the sample streams of reaction mixture with air.

Preferred embodiments of the invention are illustrated in the drawings, in which:

FIG. 3 is a graph representing the linear relationship between voltage differences in millivolts and chlorate ion concentration in grams per liter, using calorimetric measurements; and FIG. 4 is a graph showing the linear relationship between the voltage difference in millivolts against hydrogen ion concentration in moles, using calorimetric measurements.

Figure 1:
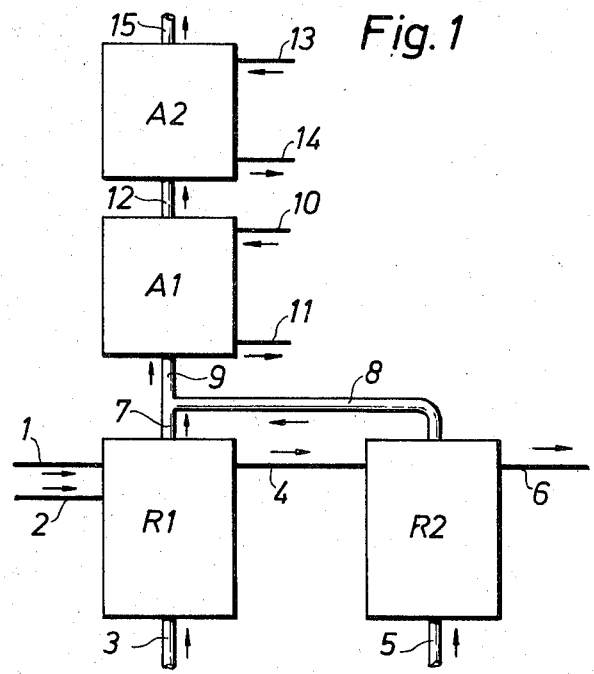
FIG. 1 is a flow diagram showing a reaction system for producing chlorine dioxide to which the process of the invention is applied.

The flow diagram of FIG. 1 shows a typical system for producing chlorine dioxide from sodium chlorate, sodium chloride, sulfuric acid and sulfur dioxide. The reaction system is composed of two reactors, R1, R2, connected in series by the line 4. The first reactor R1 is provided with two inlet lines, line 1 for aqueous sodium chlorate solution containing a small amount of sodium chloride, and line 2 for sulfuric acid. Discharge line 6 from reaction R2 serves for removal of residual acid. Inlet lines 3 and 5 in the reactors R1, R2, respectively, are for reducing agent, in this case sulfur dioxide gas, and overhead gas discharge lines 7 and 8 of reactors R1, R2, respectively, are for chlorine dioxide and chlorine.

The chlorine dioxide lines 7, 8 combine to join the inlet 9 of the first of two absorption towers A1, A2, connected in series by line 12. The tower A1 has at the top a water inlet line 10 which feeds water countercurrently to the flow of chlorine dioxide and chlorine gas in the tower, and a line 11 is provided at the bottom for removal of aqueous chlorine dioxide solution thereby formed. $ClO_2$ is thus removed in tower A1. Line 13 is an inlet to tower A2 at the top for aqueous alkaline solution such as alkali metal or alkaline earth metal hydroxide which is flowed countercurrently through the absorption tower A2 to the chlorine gas flow from tower A1. An outline line 14 is provided at the bottom for removal of aqueous alkaline chloride solution. $Cl_2$ and any residual $ClO_2$ are thus removed in tower A2. The gas outlet 15 is provided for venting residual gases not separated in the absorbers to the atmosphere.

The system shown in FIG. 1 is adapted for continuous operation, as follows: A saturated aqueous solution of sodium chlorate containing 600 to 650 grams sodium chlorate per liter and approximately 100 grams sodium chloride per liter is pumped through the supply line 1 into the reaction vessel R1. Concentrated sulphuric acid is introduced to the reactor R1 through the line 2, and a mixture of inert gases with sulfur dioxide in an amount of approximately 10 percent by volume is introduced through the line 3. Chlorine dioxide and chlorine gas are removed overhead from the reactor R1 through the line 7.

Most of the sodium chlorate in the reaction R1 is consumed before the reaction mixture is drawn off through the line 4. The aqueous acidic reaction mixture moving through the line 4 has a sodium chlorate concentration of approximately 50 grams per liter. It passes to the second reaction vessel R2, where a sulfur dioxide inert gas mixture containing approximately 10 percent $SO_2$ by volume is introduced through the line 5. Additional chlorine dioxide and chlorine formed are drawn off overhead through the gas outlet line 8, while the residual aqueous acid solution containing sulphuric acid, sodium bisulfate and sodium chlorate, now only in from 0 to 10 grams per liter, is removed through the acid discharge line 6. Any sodium chlorate in this acid solution is lost, and the concentration of sodium chlorate in this solution is therefore kept to a minimum.

The chlorine dioxide and chlorine gas from reactor R1 and R2 pass through the first absorber, where $ClO_2$ is absorbed in water to form an aqueous chlorine dioxide solution, removed through line 11 and used, for example, to bleach cellulose pulp. The remaining gases containing chlorine and a small proportion of chlorine dioxide enter the absorber A2, having passed through the line 12, where the chlorine and any remaining chlorine dioxide are washed out with an alkaline solution such as aqueous sodium hydroxide, introduced through the line 13 and removed through the line 14. The residual gases are vented to the atmosphere, through the outlet 15.

Figure 2:
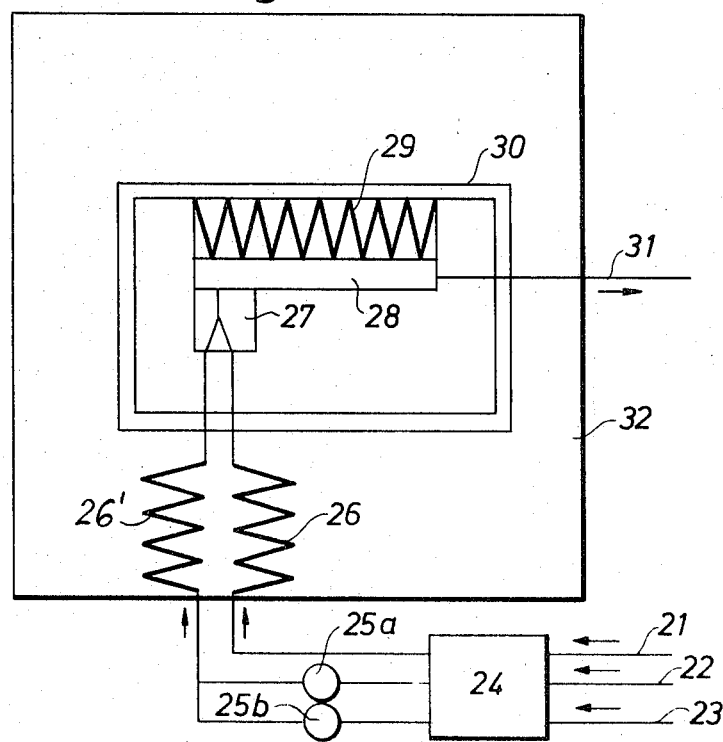
FIG. 2 is a schematic representation of an isothermal calorimetric analysis system for use in carrying the process of the invention.

The hydrogen ion and chlorate ion concentrations in the reaction mixture in the reaction vessels R1, R2 and the residual acid leaving through the acid line 6 are monitored by the analysis system illustrated in FIG. 2, so as to maintain an optimum chlorate and hydrogen ion concentration in each reactor, and a minimum chlorate ion in the exiting residual acid in line 6, by appropriate adjustment of sodium chlorate concentration and sulphuric acid concentration and the relative amounts of the solutions entering the reactor R1 through lines 1 and 2. The calorimetric system shown in FIG. 2 measures the heat of reaction liberated by the reaction of chlorate ion with chlorate ion reagent, and hydrogen ion with a hydrogen ion reagent, isothermically. However, a calorimeter which measures the reaction heat developed adiabatically also can be used.

The calorimetric analysis system of FIG. 2 comprises a peristaltic pump 24 pumping fluid through the intake lines 21, 22 and 23. Line 22 is for a sample from the chlorine dioxide manufacturing system of FIG. 1, and can be in fluid flow connection with reactors R1 and/or R2 and/or line 6 by appropriate adjustment of valves, as desired, so that a sample can be drawn if desired from time to time or continuously from any of these sources. Also, if desired, three like calorimetric analysis systems, one for reactor R1, one for reactor R2, and one for line 1, can be provided, so that chlorate ion concentration and hydrogen ion concentration in each of these portions of the system can be monitored continuously and simultaneously.

Lines 21 and 23 are for the chlorate ion or hydrogen ion reagent solution and a reference solution, respectively. Valves 25a and 25b control the flow of fluid through the lines 22, 23, so that fluids flow through only one of these lines at a time, i.e., either reference solution, or sample solution, but not both.

Line 21 leads to a thermostat coil 26 and thence to a mixing vessel 27, while lines 22, 23 lead through valves 25a, 25b, respectively, to the thermostat coil 26' and thence to the mixing vessel 27, where the reference solution or sample solution and the chlorate ion or hydrogen ion reagent solution are mixed together, with liberation of heat. The resulting mixture then passes to the reaction vessel 28, and is discharged through the outlet line 31.

The reaction vessel 28 is in contact with a thermopile 29, and this in turn is in contact with a metal vessel 30, which together with the thermostat coils, mixing vessel and reaction vessel is immersed in a thermostat bath 32. The heat of reaction liberated in the reaction vessel 28 thus can be transferred through the thermopile 29 to the thermostat bath 32. The signal or voltage pulse from the thermopile 29 is measured on a voltmeter (not shown), or registered on a recorder (not shown), and is a measurement of the heat of reaction of the reagent with the reference solution, or the sample solution, respectively.

The signal obtained when the reagent solution and the reference solution are mixed is taken as the base line or zero level. The signal obtained when the reagent solution and the sample solution are mixed is taken as the final reading, and the difference between the two is a function of the heat liberated, and can be taken as a measurement of the chlorate ion or hydrogen ion concentration of the solution. A suitable calibration curve of ion concentration against the magnitude of the signal or pulse enables one to read off the ion concentration directly, but the correlation can also be made mathematically.

In operation, reference solution is flowed through line 23 and reagent solution through line 21 by means of the pump 24. Valve 25b is open, and valve 25a is closed. The two solutions are passed through the thermostat coils 26, 26' and then into the mixing vessel 27 and the reaction 28, where the heat liberated is detected as a voltage pulse and measured on a volt-meter.

The flow of reference solution in line 23 is then stopped by closing the valve 25b, and the flow of sample solution in line 22 started by opening the valve 25a. Sample solution and reagent are now mixed in the mixing vessel 27, after passing through the thermostat coils 26, 26' and pass into the reaction vessel 28, where the heat is transferred to the thermopile 29 and eventually reflected in the voltmeter. The voltage difference between the final reading and the reference or zero level is the measurement of the chlorate or hydrogen ion concentration of the solution.

Using this system, very accurate analyses of chlorate and hydrogen ion concentration in the reaction mixture can be made. The following Examples illustrate this.

EXAMPLE A

Four aqueous calibration solutions containing 0.5, 1.0, 1.5 and 2 grams of sodium chlorate per liter were prepared. To the solutions sulphuric acid was added, to a concentration of 5.5 molar.

A chlorate ion reagent was then prepared by dissolving 120 grams of ferrous sulphate $FeSO_4 7H_2O$ in 800 ml. of 5.5 molar sulphuric acid solution.

As a reference solution, 5.5 molar aqueous sulphuric acid was used.

Each of these solutions was then put through the calorimetric analysis system of FIG. 2 to determine the voltage difference in millivolts at each sodium chlorate concentration. The values are set forth in Table I:

TABLE 1

| Voltage Difference Millivolts | $NaClO_3$ g/l |
|---|---|
| 5.6 | 0.5 |
| 11.2 | 1.0 |
| 16.5 | 1.5 |
| 22.3 | 2.0 |
| 33.40 | 3.0 |
| 44.7 | 4.0 |
| 55.9 | 5.0 |

From this data, the calibration curve shown in FIG. 3 was then prepared plotting the voltage difference in millivolts against these known sodium chlorate ion concentrations. These curves make it possible to analyze sodium chlorate solutions of unknown chlorate ion concentrations, since from the value in millivolts one can read off from the curve the chlorate ion concentration of the solution. As FIG. 3 shows, the calibration curve is linear, which is a distinct advantage in using the calorimetric analysis system of the invention.

EXAMPLE B

Four calibration sulfuric acid solutions containing 0.1, 0.2, 0.3 and 0.4 molar hydrogen ion concentration were prepared.

A hydrogen ion reagent solution was prepared containing 0.5 mole of sodium hydroxide per liter.

Distilled water was used as a reference solution.

Using the calorimetric analysis system of FIG. 2, the voltage difference in millivolts at each hydrogen ion concentration was then determined. The values are set forth in Table II:

TABLE II

| Voltage Difference Millivolts | $H^+$ion (Molar) |
| --- | --- |
| 4.5 | 0.1 |
| 8.5 | 0.2 |
| 12.8 | 0.3 |
| 17.5 | 0.4 |
| 21.2 | 0.5 |
| 42.6 | 1.0 |

From this data, a calibration curve was then prepared, plotting the voltage differences in millivolts against hydrogen ion concentration in moles, as shown in FIG. 4. Using this calibration curve, it is possible to determine the hydrogen ion concentration of an unknown sample, by reading it off at the value in millivolts obtained using the analysis system.

The cailbration curve is shown in FIG. 4 is linear, which is a distinct advantage.

It is apparent from the linear curves of FIGS. 3 and 4 that both chlorate ion and hydrogen ion concentrations can be determined with great accuracy.

EXAMPLE 1

The chlorine dioxide manufacturing system of FIG. 1 was used in these experiments. A saturated solution of sodium chlorate containing 600 to 650 grams of sodium chlorate per liter and 100 grams sodium chloride per liter was pumped into the reaction vessel R1 through line 1 and 5.5 molar sulphuric acid through line 2. Chlorine dioxide and chlorine gas were separated through overhead line 7. The residual reaction mixture was passed through the connecting line 4 to the reaction vessel R2, and a series of samples were taken from the reaction vessel R2 using the calorimetric analysis system of FIG. 2. These samples were analyzed for chlorate ion and for hydrogen ion concentration. As a control, the samples were also analyzed by a known accurate idometric titration technique. The results obtained for the chlorate ion concentration are given in Table III.

TABLE III

| Voltage Difference Millivolts | $NaClO_3$ calorimetric g/l | $NaClO_3$ iodometric g/l |
| --- | --- | --- |
| 40.0 | 3.6 | 3.5 |
| 36.8 | 3.3 | 3.6 |

TABLE III-Continued

| Voltage Difference Millivolts | $NaClO_3$ calorimetric g/l | $NaClO_3$ iodometric g/l |
| --- | --- | --- |
| 35.6 | 3.2 | 3.5 |
| 33.5 | 3.0 | 3.2 |
| 31.2 | 2.8 | 3.1 |
| 30.1 | 2.7 | 2.9 |
| 28.9 | 2.6 | 2.8 |

It is apparent from the Table that the calorimetric analysis gave results which were in full agreement with the iodometric titration analysis. The tests thus confirm that the calorimetric method of the invention provides an accurate analysis of chlorate ion concentration.

The samples from the reaction vessel R2 that were analyzed for hydrogen ion concentration using the calorimetric analysis system of FIG. 2 were compared with analysis by potentiometric titration, as a control. The results are shown in Table IV. Since the samples removed from the reaction vessel had a high sulphuric acid content, they were diluted 10 times with water.

TABLE IV

| Voltage Difference Millivolts | $H^+$-ion calorimetric M | $H^+$-ion potentiometric M |
| --- | --- | --- |
| 39.23 | 9.21 | 9.20 |
| 39.15 | 9.19 | 9.21 |
| 39.19 | 9.20 | 9.18 |
| 40.17 | 9.43 | 9.40 |
| 39.96 | 9.38 | 9.39 |
| 40.04 | 9.40 | 9.42 |
| 37.87 | 8.89 | 8.88 |
| 37.79 | 8.87 | 8.89 |
| 37.71 | 8.90 | 8.90 |
| 38.43 | 9.02 | 9.03 |
| 38.55 | 9.05 | 9.04 |
| 38.47 | 9.03 | 9.08 |

As this Table shows, the calorimetric analysis method gives analytical results that are fully comparable with the potentiometric titration. Thus, the calorimetric technique provides an accurate analysis of hydrogen ion concentration.

A chlorine dioxide manufacturing system of the type illustrated in FIG. 1 can consume approximately 20,000 tons of sodium chlorate and 20,000 tons of sulphuric acid per year. By applying the monitoring system of the invention to this manufacturing system, the chlorate ion concentration in the residual reaction solution removed via line 6 can be reduced, which is reflected in a corresponding saving, approximately 250 tons a year, in the amount of sodium chlorate. The consumption of sulphuric acid is reduced at the same time by approximately 600 tons a year. This saving in chlorate is primarily obtained due to a more complete reaction of chlorate in the second reaction vessel R2. If the reaction conditions in the first reaction vessel R1 are optimized, a further reduction in chlorate consumption can be obtained, since here the principal portion of the sodium chlorate is consumed.

Thus, by using the process of the invention, the following advantages can be obtained:

1. An inexpensive and rapid monitoring system is provided, which eliminates time-consuming manual analysis at a considerable labor cost.

2. The monitoring system can be applied continuously, which renders the control more effective.

3. The calorimetric analysis system is a simple and inexpensive construction.

4. Strong signals can be obtained relatively easily from the thermopile or thermistor, which means that only simple electronic apparatus is required.

5. A linear relationship between chloride ion concentration and hydrogen ion concentration and the electric signal given can be established.

6. The use of highly refined or pure chemicals and reagents is not necessary. Reagents and chemicals of moderate purity can be used.

7. there is no need to detect an end point in the reaction on which the calorimetric analysis system is based, since the chlorate ion reagent or hydrogen ion reagent is added in excess.

8. In addition to a reduction in the quantity of chemicals consumed, the improved process control also give a decrease in the number of chlorine dioxide gas explosions, thereby reducing the number of interruptions in manufacture.

Having regard to the foregoing disclosure, the following is claimed as the inventive and patentable embodiments thereof:

1. A process for measuring the chlorate ion and the hydrogen ion concentration of chlorine dioxide-producing reaction mixtures comprising alkali metal chlorate, reducing agent, and inorganic acid by a calorimetric determination, which comprises withdrawing a sample of the reaction mixture, combining it with a chlorate ion reagent which reacts with chlorate ions with liberation of heat, measuring the heat liberated, and from this heat determining the concentration of chlorate ion, withdrawing another sample of the reaction mixture, combining it with a hydrogen ion reagent which reacts with hydrogen ions with liberation of heat, measuring heat liberated and from this heat determining the concentration of hydrogen ion.

2. A process in accordance with claim 1, which comprises controlling the amount of alkali metal chlorate and/or reducing agent and/or acid to the reaction mixture to maintain chlorate and hydrogen ion concentration at a desired level in the reaction mixture.

3. A process in accordance with claim 1, in which the calorimetric determination is carried out with a calorimeter determining the heat liberated adiabatically.

4. A process in accordance with claim 1, in which the calorimetric determination is carried out with a calorimeter determining the heat liberated isothermally.

5. A process in accordance with claim 1, in which the calorimetric determination is carried out with a calorimeter which converts the heat liberated to an electric signal which is a function of the heat liberated.

6. A process in accordance with claim 1, in which the chlorate ion reagent is selected from the group consisting of sulfuric acid solutions of ferrous sulphate, hydrazine hydrogen sulphate, hydroxylamine, and mixtures thereof.

7. A process in accordance with claim 1, in which the hydrogen ion reagent is a strong base which reacts exothermically with acids.

8. A process in accordance with claim 7, in which the hydrogen ion reagent is a strong base selected from the group consisting of alkali metal and alkaline earth metal hydroxides.

9. A process in accordance with claim 1, in which the amount of chlorate ion reagent or hydrogen ion reagent added is in excess to ensure complete liberation of the stoichiometric amount of heat.

10. A process in accordance with claim 1, in which the sampling and measuring are applied to the reaction mixture from time to time.

11. A process in accordance with claim 1, in which the sampling and measuring are applied to the reaction mixture continuously.

12. A process in accordance with claim 1, in which the reducing agent is sodium chloride and/or sulphur dioxide or methanol, and the inorganic acid is sulphuric acid.

13. A process for control of a chlorine dioxide-producing reaction system comprising an alkali metal chlorate, inorganic acid and reducing agent, comprising determining calorimetrically the concentrations of chlorate and hydrogen ions in the reaction mixture, and according to the concentrations thus determined controlling the addition of alkali metal chlorate, reducing agent and acid to the system so as to maintain the chlorate ion and hydrogen ion concentrations thereof at a level to favor the reactions resulting in the production of chlorine dioxide, and minimize side reactions resulting in loss of chlorate, such as in the formation of chlorine and alkali metal chlorides.

14. A process in accordance with claim 13, in which the reaction system is a batch reaction system.

15. A process in accordance with claim 13, in which the reaction system is a continuous flow reaction system.

16. A process in accordance with claim 13, wherein the chlorate ion reagent is selected from the group consisting of sulphuric acid solution of ferrous sulphate, hydrazine hydrogen sulphate, hydroxylamine and mixtures thereof.

17. A process in accordance with claim 13, wherein the hydrogen ion reagent is selected from the group consisting of alkali metal and alkaline earth metal hydroxides.

18. A process in accordance with claim 13, in which the calorimetric determination is carried out with a calorimeter determining the heat liberated isothermally.

19. A process in accordance with claim 13, in which the calorimetric determination is carried out with a calorimeter determining the heat liberated adiabatically.

20. An apparatus for continuously producing chlorine dioxide from alkali metal chlorate, inorganic acid and reducing agent, monitoring chlorate ion and hydrogen ion concentration in the reaction mixture, and controlling addition of alkali metal chlorate, inorganic acid, and reducing agent to maintain a predetermined chlorate ion and hydrogen ion concentration in the reaction mixture, comprising, in combination, at least one reactor having inlet lines for aqueous alkali metal chlorate solution, reducing agent, and inorganic acid, and discharge lines for chlorine dioxide and residual acid solution; at least one absorption tower for flow of water countercurrently to flow of chlorine dioxide gas in the tower, and an outlet for aqueous chlorine dioxide solution; and a calorimetric analysis system in continuous fluid flow connection with the reactor for monitoring by a calorimetric determination the hydrogen ion and chlorate ion concentrations in the reaction mixture in the reactor; and means for controlling the feed of alkali metal chlorate, inorganic acid and reducing agent to the reactor, so as to maintain an optimum chlorate and hydrogen ion concentration in the reactor, and a minimum chlorate ion in the exiting residual acid.

21. An apparatus in accordance with claim 20, in which the calorimetric analysis system measures the heat of reaction liberated by the reaction of chlorate ion with a chlorate ion reagent, and hydrogen ion with a hydrogen ion reagent, isothermally.

22. An apparatus in accordance with claim 20, in which the calorimetric analysis system measures the heat of reaction liberated by the reaction of chlorate ion with a chlorate ion reagent, and hydrogen ion with a hydrogen ion reagent, adiabatically.

23. An apparatus in accordance with claim 20, in which the calorimetric analysis system comprises a peristaltic pump for withdrawing an analysis sample from the reactor, and for withdrawing a like portion of chlorate ion reagent or hydrogen ion reagent for mixing therewith; means for bringing both sample and reagent to the same temperature; a mixing vessel where they are mixed together with liberation of heat; and a calorimeter for measuring the heat that is liberated.

24. An apparatus according to claim 23 comprising a thermopile to which the heat liberated is transferred and transmitted as a voltage pulse, and a voltmeter for measuring the voltage pulse.

* * * * *